(12) United States Patent
Fatma et al.

(10) Patent No.: US 11,645,452 B2
(45) Date of Patent: May 9, 2023

(54) PERFORMANCE CHARACTERISTICS OF CARTRIDGE ARTIFACTS OVER TEXT PATTERN CONSTRUCTS

(71) Applicant: International Business Machines Corporation, Armonk, NY (US)

(72) Inventors: Ishrat Fatma, Millburn, NJ (US); Sandhya Nayak, Jersey City, NJ (US); Scott Carrier, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/571,833

(22) Filed: Jan. 10, 2022

(65) Prior Publication Data
US 2022/0129623 A1  Apr. 28, 2022

Related U.S. Application Data

(63) Continuation of application No. 16/925,537, filed on Jul. 10, 2020, now Pat. No. 11,250,205.

(51) Int. Cl.
*G06F 3/048* (2013.01)
*G06F 40/169* (2020.01)
*G06F 40/40* (2020.01)
*G06F 40/177* (2020.01)
*G06F 16/33* (2019.01)

(52) U.S. Cl.
CPC ........ *G06F 40/169* (2020.01); *G06F 16/3344* (2019.01); *G06F 40/177* (2020.01); *G06F 40/40* (2020.01)

(58) Field of Classification Search
CPC .... G06F 40/169; G06F 16/3344; G06F 40/40; G06F 40/177
See application file for complete search history.

(56) References Cited

U.S. PATENT DOCUMENTS 10,558,754 B2  2/2020  Razack et al.
10,943,068 B2  3/2021  Poon et al.
(Continued)

OTHER PUBLICATIONS

Bao et al., "Table-to-Text: Describing Table Region with Natural Language," The Thirty-Second AAAI Conference on Artificial Intelligence (AAAI-18), pp. 5020-5027, 2018; 8 pages.
(Continued)

*Primary Examiner* — David Phantana-angkool
(74) *Attorney, Agent, or Firm* — Cantor Colburn LLP; Kelsey Skodje

(57) ABSTRACT

Embodiments of the present invention are directed to evaluating the performance characteristics of annotator configurations against text pattern constructs in unstructured text. In a non-limiting embodiment of the invention, unstructured text is received by a processor. A text pattern construct is identified in the unstructured text and a first performance characteristic of an annotator is determined based on the text pattern construct. The text pattern construct is converted to a natural language text and a second performance characteristic of the annotator is determined based on the natural language text. A delta is determined between the first performance characteristic and the second performance characteristic. An alternative annotator configuration is identified for a portion of the unstructured text comprising the text pattern construct.

20 Claims, 6 Drawing Sheets

(56) References Cited

U.S. PATENT DOCUMENTS

| | | | |
|---|---|---|---|
| 10,984,247 B2 | 4/2021 | Takegawa et al. | |
| 11,048,979 B1 | 6/2021 | Zhdanov et al. | |
| 11,068,656 B2 | 7/2021 | Tan et al. | |
| 11,113,469 B2 | 9/2021 | Allen et al. | |
| 11,227,102 B2* | 1/2022 | Das | G06F 40/40 |
| 11,250,205 B2* | 2/2022 | Fatma | G06F 40/177 |
| 11,354,110 B2* | 6/2022 | Jonna | G06F 40/20 |
| 2015/0309990 A1 | 10/2015 | Allen et al. | |
| 2016/0314106 A1* | 10/2016 | Carrier | G06F 40/189 |
| 2018/0075013 A1* | 3/2018 | Razack | G06N 5/022 |
| 2018/0232357 A1 | 8/2018 | Beller et al. | |
| 2018/0330820 A1 | 11/2018 | Sevenster et al. | |
| 2018/0336183 A1 | 11/2018 | Lee et al. | |
| 2019/0121841 A1* | 4/2019 | Sbodio | G06F 40/279 |
| 2019/0384807 A1* | 12/2019 | Dernoncourt | G06N 3/08 |
| 2019/0385364 A1* | 12/2019 | Joseph | G06T 17/00 |
| 2020/0159738 A1* | 5/2020 | Mutalikdesai | G06F 16/24575 |
| 2020/0159754 A1* | 5/2020 | Mutalikdesai | G06F 16/353 |
| 2020/0160231 A1 | 5/2020 | Asthana et al. | |
| 2020/0184155 A1 | 6/2020 | Galitsky | |
| 2020/0293712 A1* | 9/2020 | Potts | G06F 40/279 |
| 2020/0327194 A1 | 10/2020 | Tan et al. | |
| 2021/0256160 A1 | 8/2021 | Hachey | |
| 2021/0272599 A1 | 9/2021 | Patterson et al. | |
| 2021/0397654 A1* | 12/2021 | Carrier | G06F 40/279 |
| 2021/0397782 A1* | 12/2021 | Carrier | G06F 16/955 |

OTHER PUBLICATIONS

Cao, J., "Generating Natural Language Descriptions from Tables," IEEE Access, v. 8, pp. 46206-46216, 2020; 11 pages.

Fatma et al, "Performance Characteristics of Cartridge Artifacts Over Text Pattern Constructs," U.S. Appl. No. 16/925,537, filed Jul. 10, 2020.

Lebret et al., "Neural Text Generation from Structured Data with Application to the Biography Domain," [Submitted on Mar. 24, 2016 (v1), last revised Sep. 23, 2016 (this version, v3)], https://arxiv.org/abs/1603.07771; 11 pages.

List of IBM Patents or Patent Applications Treated as Related; Date Filed: Jan. 11, 2022, 2 pages.

Milosevic et al., "A framework for information extraction from tables in biomedical literature." International Journal on Document Analysis and Recognition (IJDAR) vol. 22, pp. 55-78, 2019.

Wiseman et al., "Challenges in Data-to-Document Generation." [Submitted on Jul. 25, 2017], https://arxiv.org/abs/1707.08052; 13 pages.

Yang et al., "Reference-Aware Language Models." [Submitted on Nov. 5, 2016 (v1), last revised Aug. 9, 2017 (this version, v5)], https://arxiv.org/abs/1611.01628; 14 pages.

* cited by examiner

PERFORMANCE CHARACTERISTICS OF CARTRIDGE ARTIFACTS OVER TEXT PATTERN CONSTRUCTS

BACKGROUND

The present invention generally relates to natural language processing (NLP), and more specifically, to the identification of text pattern constructs and the performance characteristics of cartridge artifacts over those text pattern constructs.

Machine learning is a form of artificial intelligence that uses algorithms to enable a system to learn from data rather than through explicit programming. Machine learning follows a process of preparing data, training an algorithm to generate a machine learning model, and then making and refining predictions. Machine learning algorithms learn from a labelled set of features from training data. The field of machine learning has been gaining momentum due to the capabilities of state-of-the-art processors and to the abundant amount of digitized data that is available, which are both key to achieving accurate predictions.

NLP is a process that can leverage machine learning to process and analyze large amounts of natural language data. This natural language data is sometimes referred to as a corpus. In linguistics, a corpus or text corpus is a language resource consisting of a large set of structured and unstructured text. With the massive amounts of data that are available and being added to computer repositories each day, companies are trying to figure out how they can structure the data, clean it, and garner deeper insights from the data. NLP is the parsing and semantic interpretation of text, allowing computers to learn, analyze, and understand human language to enable, for example, communication between computers and humans in natural language.

Visual recognition is another type of machine learning or deep learning technique which provides the ability to recognize, identify and/or understand visual information from visual content such as image data and video data. Optical character recognition (OCR) refers to the conversion of images of typed, handwritten or printed text into machine-encoded text, whether from a scanned document, a photo of a document, a scene-photo (for example the text on signs and billboards in a landscape photo) or from subtitle text superimposed on an image (for example from a television broadcast). OCR is widely used as a form of data entry from printed paper data records and digitizing printed texts so that they can be electronically edited, searched, stored more compactly, displayed on-line, and used in machine learning processes.

Healthcare documents, such as medical records, are an example of a type of digitized data that is stored in computer systems. NLP techniques can be used to extract features describing a patient from a medical record(s) associated with the patient such as a medical condition of the patient, a height of the patient, and/or a test performed or scheduled to be performed on the patient. Medical records can be stored in many different formats including text data and/or image data. In addition, medical records often include structural information such as titles, sections, and headers; as well as a variety of text patterns such as structured data (e.g., paragraphs, sentences, etc.) and unstructured data (e.g., a list of symptoms, conditions listed in bullet points, etc.).

SUMMARY

Embodiments of the invention are directed to a computer-implemented method for evaluating the performance characteristics of annotator configurations against text pattern constructs in unstructured text. A non-limiting example of the method includes receiving unstructured text. A text pattern construct is identified in the unstructured text and a first performance characteristic of an annotator is determined based on the text pattern construct. The text pattern construct is converted to a natural language text and a second performance characteristic of the annotator is determined based on the natural language text. A delta is determined between the first performance characteristic and the second performance characteristic. An alternative annotator configuration is identified for a portion of the unstructured text comprising the text pattern construct.

In some embodiments of the invention, the alternative annotator configuration is optimized or otherwise better suited to annotating the text pattern construct than the initial annotator configuration. Thus, advantageously, the annotation accuracy of an NLP request can be improved. Other embodiments of the present invention implement features of the above-described method in computer systems and computer program products.

Embodiments of the invention are directed to a computer-implemented method for selecting annotator configurations. A non-limiting example of the method includes receiving an NLP request associated with unstructured text. A set of text pattern constructs can be identified in the unstructured text. The set of text pattern constructs can include a first text pattern construct and a second text pattern construct. The method can include determining a first annotator configuration for a first portion of the unstructured text comprising the first text pattern construct and a second annotator configuration for a second portion of the unstructured text comprising the second text pattern construct. An NLP response can be generated for the unstructured text. The NLP response can include a first annotation of the first portion of the unstructured text by the first annotator configuration and a second annotation of the second portion of the unstructured text by the second annotator configuration.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
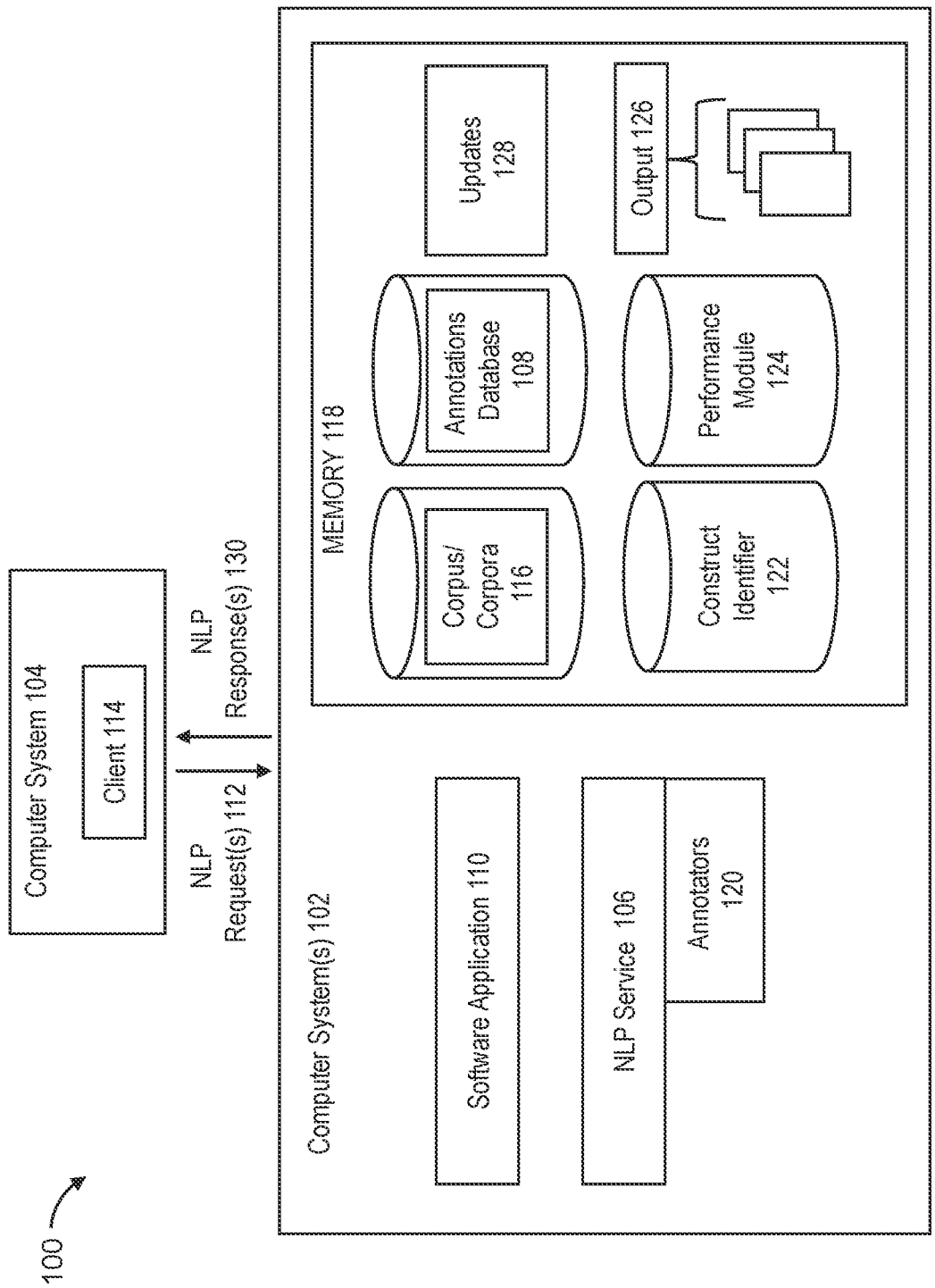
FIG. 1 depicts a block diagram of a system for identifying a construct in a text corpus and suggesting alternative NLP techniques that can be employed for the construct according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention are directed to the identification of text pattern constructs in a text corpus and the performance characteristics of cartridge artifacts over those text pattern constructs. A text corpus can include any structured or unstructured text, such as, for example, a healthcare document. Healthcare documents can include, but are not limited to medical records, lab reports, pathology reports, and pre-authorization forms. Healthcare documents can be used by medical practitioners to understand the medical history, or previous health status, of the patient, as well as to keep the medical practitioner up to date about the patient's current status in order to aid the medical practitioner in providing the patient with optimal healthcare.

Large volumes of healthcare documents can be analyzed by NLP services or engines to automatically extract or create workable data for medical practitioners, for example, to provide predictions about the future health state of a patient and/or to provide trends or predictions related to a group of patients. These trends or predictions can be based on past or current patient status and/or predicting outcomes associated with various medical treatments that may be provided to the patient. The process of extracting workable data using NLP is often simply referred to as feature extraction.

A corpus annotator is a type of NLP service that can supplement a text corpus with workable data. Annotators can be generic or domain specific, such as the Annotator for Clinical Data (ACD), optimized for clinical data. Annotators can be configured using configuration editor tools to provide an almost limitless variety of annotation outputs (e.g., feature extractions). For example, one type of annotator is a tokenizer configured to split text or sentences into words or word-level units. Another example annotator is a parser configured to perform syntactic analysis of a sentence to build a syntactic tree or graph. Yet another example annotator is a part-of-speech tagger configured to determine a part of speech of each word in the context of a sentence. It is understood that annotators are not limited to the examples provided.

Unfortunately, inaccuracies can occur when performing feature extraction on healthcare documents such as medical records due to the generally unstructured nature of those documents being misinterpreted by conventional NLP annotators. For example, a medical evaluation form produced by a medical practitioner can include a mixture of sentences (e.g., speech-to-text dictations), bulleted lists (e.g., a set of medical conditions), tables (e.g., dosages vs. patient response), and comma-separated lists (e.g., doctor observations such as "depression, anxiety, difficulty sleeping," etc.). An annotator can misinterpret unstructured text that does not align with its configuration (cartridge artifacts). For example, a negation annotator can fail to properly annotate a comma-separated list that is poorly punctuated (lack of periods, missing commas, etc.). This is due to the fact that current configuration editor tools do not provide a way to recognize when the presence of a particular text pattern (e.g., list, bullet points, etc.) requires a specific treatment outside of the scope of the current annotators or configurations available to the NLP service.

Turning now to an overview of aspects of the present invention, one or more embodiments of the invention address the above-described shortcomings of the prior art by providing a platform for identifying text pattern constructs in a text corpus, evaluating the performance characteristics of cartridge artifacts over those constructs, and suggesting alternative NLP techniques (e.g., annotator configurations) that can be employed for specific constructs when the current cartridge artifacts provide poor annotation performance.

NLP techniques can be suggested immediately when the current configuration is already known to provide poor performance for a construct identified in a target text corpus. Alternatively, given a newly defined configuration whose performance for a given construct is unknown, or an annotator whose performance is uncertain, the construct is converted to provide a natural language rendition of the content. The performance of artifacts or annotators on both the canonical text as well as the more natural language rendition of that same content is then analyzed to determine whether there may be deltas in the output of an annotation between the two forms. If deltas are present, the deltas may be rendered to the domain expert to determine how to proceed or whether further analysis is warranted. In some embodiments of the invention, the deltas are provided to the domain expert alongside suggested alternative NLP techniques known by the system to provide better annotation performance for one or more constructs in the text corpus.

Advantageously, by being able to recognize that a current annotator configuration provides poor performance for a target text corpus, we can enable ways to suggest different settings/configurations that can help fill in for the annotator's shortcomings. This platform can be used to identify and suggest alternative techniques in NLP services such as the Annotator for Clinical Data (ACD) and can result in more accurate feature extraction from documents. In some embodiments of the invention, a domain expert can specify configurations to call out lists/bullets/other patterns in an unstructured text and to define specific configurations that are applicable only to those patterns.

In accordance with one or more embodiments of the present invention, NLP techniques are used to extract features (e.g., facts) about a patient from one or more healthcare documents that are associated with the patient. Information in the healthcare documents can be entered by the patient, by the doctor, and/or a third party. In addition, or alternatively, information in the healthcare documents can be provided automatically, for example as part of a form for the doctor or patient, or as an output from a test (e.g., a blood test result or MRI image). The healthcare documents can be in a text format and/or an image format.

As used herein, the terms "record" and "document" are used interchangeably to refer to a grouping of digitized data that is stored by a computer and processed as a single unit. A record or document may have one or more portions containing structured data (e.g., character string data, sentences, etc.) and one or more portions containing unstructured data (e.g., form data, tables, comma-separated lists, etc.). A portion includes a least a subset of the record or document. As used herein, the term "character string data" refers to a group of one or more text characters (e.g., natural language data) which may be grouped into sentences or paragraphs.

As used herein, the terms "NLP engine" and "NLP service" refer to software and/or hardware components that process and analyze natural language data (written and/or spoken). For written data, the natural language data that is input to the NLP engine can be grouped into documents which may include, for example, one or more sentences, one or more paragraphs, one or more forms, one or more charts, one or more bulleted lists, one or more lists (comma-separated or otherwise), and/or one or more pages. One or more embodiments of the present invention described herein include an NLP engine which has been trained using training data to extract features from specific constructs (e.g., a health condition or status of a patient from a bulleted list). The terms "trained NLP engine" or "NLP engine that has been trained" are used interchangeably herein refer to an NLP engine that has been programmed using a machine learning technique to analyze a particular aspect(s) of the input documents.

As used herein, the terms "performance," "accuracy," or "accuracy threshold" of an NLP refers to a likelihood (or probability) that a feature output from the NLP engine is correct. This can be assessed in a variety of manners such as, but not limited to, precision, recall and $F_1$ score (also known as the Sørensen-Dice coefficient or Dice similarity coefficient).

Examples described herein relate to healthcare documents which are just one type of document that may be input to one or more embodiments of the present invention. One skilled in the art will recognize that one or more embodiments of the present invention described herein can be applied to any type of documents that may contain form or other non-character string type data.

Turning now to a more detailed description of aspects of the present invention, FIG. 1 depicts a block diagram 100 of a system for identifying a construct in a text corpus and suggesting alternative NLP techniques that can be employed for the construct when a current NLP technique (e.g., a cartridge artifact) provides poor annotation performance (accuracy) against the construct in accordance with one or more embodiments of the present invention. In some embodiments of the invention, one or more computers system(s) 102 are coupled to a computer system 104. While shown in a particular configuration for ease of illustration, it is understood that any elements of the block diagram 100 (e.g., NLP service 106, annotations database 108, etc.) may be used and/or integrated within either or both of the computers systems 102 and 104.

In some embodiments of the invention, one or more software application(s) 110 on computer system 102 are configured to receive one or more natural language processing (NLP) requests 112. Software application 110 can be implemented as software executed on one or more processors (e.g., CPU(s) 602a, 602b, 602c of FIG. 6). In some embodiments of the invention, the requests 112 are received from a client 114 of the computer system 104. The NLP requests 112 can be made using software application 110 and/or received from computer system 104. The NLP request 112 can include or be associated with a corpus/corpora 116 that can be fully or partially loaded into a memory 118 of the computer system 102. The corpus 116 can contain hundreds, thousands, and/or millions of documents, also referred to as "big data". In some embodiments of the invention, the corpus 116 includes one or more healthcare documents. In some embodiments of the invention, the healthcare documents include unstructured text.

In some embodiments of the invention, software application 110 is configured to route the NLP request 112 to the NLP service 106. In some embodiments of the invention, the NLP service 106 includes one or more annotators 120 for completing the NLP request 112. In some embodiments of the invention, the annotators 120 are retrieved from the annotations database 108. In some embodiments of the invention, the retrieved annotator 120 is stored in memory 118.

In some embodiments of the invention, the computer system 102 includes a construct identifier 122 configured to identify a text pattern construct in the unstructured text associated with the NLP request 112. The construct identifier 122 can be implemented as hardware, software, or a combination of hardware and software. In some embodiments of the invention, the construct identifier 122 is stored in memory 118.

In some embodiments of the invention, the text pattern construct includes at least one of a comma-separated list, a bullet point, a table, and/or other unstructured text constructs. Other unstructured text construct types can include checklists, text excerpts with artificial margins (i.e. new lines that represent margin boundaries rather than sentence/paragraph boundaries), multiple "headings" on a single line that are not separated by new line characters (e.g. "FIRST NAME: Jon LAST NAME: Smith STATE: NY" (all in one line)), enumerated lists, enumerated nested lists, text excepts that are ALL CAPS, text excerpts containing xml tags (e.g. html source), and json excerpts, although the specific types of constructs are not meant to be particularly limited. It is understood that a variety of construct types are possible. For example, the NLP request 112 can include a patient record having a set of conditions within a comma-separated list. More specifically, the text can include:

Psychiatric: denies depression, anxiety, mental disturbance, difficulty sleeping, hallucinations, paranoia
Endocrine: denies polyuria Here, a conventional negation annotator can miss conditions such as 'hallucinations' and 'paranoia' because of the missing period between 'paranoia' and 'Endocrine' on the following line. As unstructured text is often poorly punctuated (e.g., missing or incorrect punctuation, etc.) this type of error can be quite prevalent and can make annotators such as negation work at a reduced accuracy or fail to work at all (i.e., fail to provide meaningful annotations).

Continuing with the previous example, the construct identifier 122 can identify that the NLP request 112 includes a comma-separated list prior to annotation. In some embodiments of the invention, the NLP service 106 can determine whether the selected or loaded annotators 120 are appropriate for the NLP request 112—in this case, for comma-separated lists. If the annotators 120 do not provide sufficient performance (e.g., as measured against a threshold required performance metric), alternative annotators can be suggested or implemented. In this manner, the NLP service 106 can improve the final accuracy of the annotation of the unstructured text associated with the NLP request 112.

In some embodiments of the invention, the computer system 102 includes a performance module 124 configured to quantify the annotation performance of the annotator 120 against the text pattern construct identified by the construct identifier 122. The performance module 124 can be implemented as hardware, software, or a combination of hardware and software. In some embodiments of the invention, the performance module 124 is stored in memory 118.

To quantify the annotation performance of a given annotator 120, the performance module 124 can be configured to convert the text pattern construct to a natural language text. For example, the comma-separated list in the previous example can be converted using a text converter (not separately depicted) to a more natural language form. Similarly, tables, bulleted lists, etc. can be converted to natural language. In this manner, two data sets are provided: the first is the canonical text (e.g., the original unstructured data such as a comma-separated list), while the second is the output of the natural language text conversion.

In some embodiments of the invention, the performance module 124 is further configured to determine a first performance characteristic of the annotator 120 based on the text pattern construct in the canonical text. The first performance characteristic can include an annotation output based on the text pattern construct. In some embodiments of the invention, the performance module 124 is further configured to determine a second performance characteristic of the annotator 120 based on the natural language text. The second performance characteristic can include an annotation output based on the natural language text.

In some embodiments of the invention, the first performance characteristic includes an annotation accuracy of the annotator 120 against the text pattern construct. In some embodiments of the invention, the annotation accuracy is retrieved from a preexisting source (e.g., annotations database 108, or an external database) based on the contents of the NLP request 112 (e.g., based on the presence of one or more construct types). In some embodiments of the invention, the annotation accuracy of the annotator 120 is determined through the analysis of sample text containing the same type of construct identified in the NLP request 112. In some embodiments of the invention, metadata can be employed through either annotator/artifact authors and/or users regarding the performance of said annotators over the identified constructs. In some embodiments of the invention, the software application 110 can suggest an alternative annotator or configuration that offers an improved annotation accuracy against the identified text pattern construct. In this manner, artifacts (configurations) that are specifically designated to handle specific constructs can be identified and presented to domain experts prior to completing the annotation with a suboptimal annotator. For example, a text converter can be used to expand a comma-separated list into a natural language form that would then be more suitable for the annotator 120 when that annotator is not designed/trained to handle such constructs.

In some embodiments of the invention, the performance module 124 is further configured to compare the first performance characteristic to the second performance characteristic. In this manner, the performance module 124 can determine whether a delta exists in the annotation output of the annotator 120 between the two forms (i.e., between the canonical text and the natural language text). A delta indicates that the annotator 120 does not provide consistent annotation results against that type of text pattern construct. If a delta is present the performance module 124 can indicate or otherwise alert that the annotator 120 may not be suitable for the entirety of the NLP request 112. In some embodiments of the invention, the performance module 124 can specifically indicate the portion(s) of the NLP request 112 that are not suitable for the annotator 120.

Additionally, or alternatively, in some embodiments of the invention, the performance module 124 can identify and suggest alternative annotator configurations that offer greater performance against the specific constructs found within the NLP request 112. In some embodiments of the invention, the performance module 124 can suggest the alternative annotator configuration for the specific portion of the unstructured text that includes the identified text pattern construct. In this manner, an originally selected or configured annotator 120 can be leveraged against the bulk of the NLP request 112, while an alternative annotator configuration can be leveraged against the specific construct upon which the originally configured annotator 120 is not suitable (or is less suitable).

In another example, consider a healthcare record that includes a table of data. A user could send an NLP request for the healthcare record from the client 114 to the computer system 102. The user could further define an annotator configuration for completing the NLP request 112, or, alternatively, a third-party configuration can be provided for their cartridge. In some embodiments of the invention, the construct identified 112 will provide a callout to the user identifying the table.

In some embodiments of the invention, the performance module 124 can suggest alternative configurations to accommodate known shortcomings within the annotator configuration selected by the user and/or the third-party configurations based on the presence of the table. These shortcomings can be observed through a performance analysis against sample text or the healthcare record, or can be retrieved from a database populated with annotator-construct performance pairs. In some embodiments of the invention, the NLP service 106 can highlight which portions of the healthcare record may yield poor or unknown results from the designated annotators and/or configurations within their cartridge.

Continuing with this example, the NLP service 106 could alert the user of the presence of the table, the limitations of the currently selected annotator against tables, and the identification of an alternative configuration more suitable to tables. In other words, supplementing configurations for annotators with identified deficiencies can be used to selectively override the NLP processing for the designated constructs, such that said constructs are skipped or ignored by the defective annotator and instead analyzed using the compensating configurations.

In some embodiments of the invention, software application 110 is configured to receive an output 126 from the NLP service 106. In some embodiments of the invention, the output 126 includes annotations, features, or facts regarding, for example, the patient associated with or otherwise described by the healthcare document. In some embodiments of the invention, software application 110 is configured to perform a corpora reconciliation process using the output 126 to generate corpora updates 128, resulting in corpora updates 128 stored temporarily in memory 118. The corpora updates 128 can include new and/or updated annotations based on the annotators 120 (including any alternatively suggested annotator as described herein) that can be provided to the client 114 and/or incorporated within the annotations database 108 in an NLP response 130.

In some embodiments of the invention, the updates 128 can be previewed by a user on a display screen (e.g., display 35 in FIG. 6) before applying the changes. After approval by the user using software application 110 and/or if preview is skipped, software application 110 can be configured to apply/commit the updates 128 to the corpus associated with the NLP request 112 and/or to the annotations database 108. If the user does not approve of the updates 128, the user can modify or delete the updates 128 using, for example, the software application 110 accessed via the client 114.

The techniques and systems discussed herein provide various technical benefits. According to one or more embodiments, alternative annotator configurations can be identified and leveraged to compensate for known shortcomings in a default or user-provided annotator configuration. As a direct result, the overall annotation performance of an NLP service, and consequently, the quality of the output annotation, can be improved. While various embodiments described herein define only a single alternative configuration for ease of discussion, it is understood that any arbitrary number of alternative configurations can be identified depending on the nature of the unstructured text. For example, a healthcare document having a variety of constructs (e.g., a comma-separated list, several tables, bullets, etc.) can result in separate alternative configuration recommendations for each respective construct type. In some embodiments of the invention, each alternative configuration is leveraged only against the portion of the associated text (e.g., healthcare document) that includes the respective construct type. In this manner, each construct within an NLP request can be handled by the most appropriate annotator and the overall annotation performance can be optimized.

The embodiments described herein with respect to block diagram 100 of FIG. 1 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. In addition, the various blocks in FIG. 1 can be configured in different manners than that shown in FIG. 1. For example, the performance module 124 can be implemented as two or more distinct processes executing on different processors, for example, one process that converts a canonical text to natural language data and another that determines the presence of an output delta when annotating against the canonical text vs. the natural language data.

Figure 2:
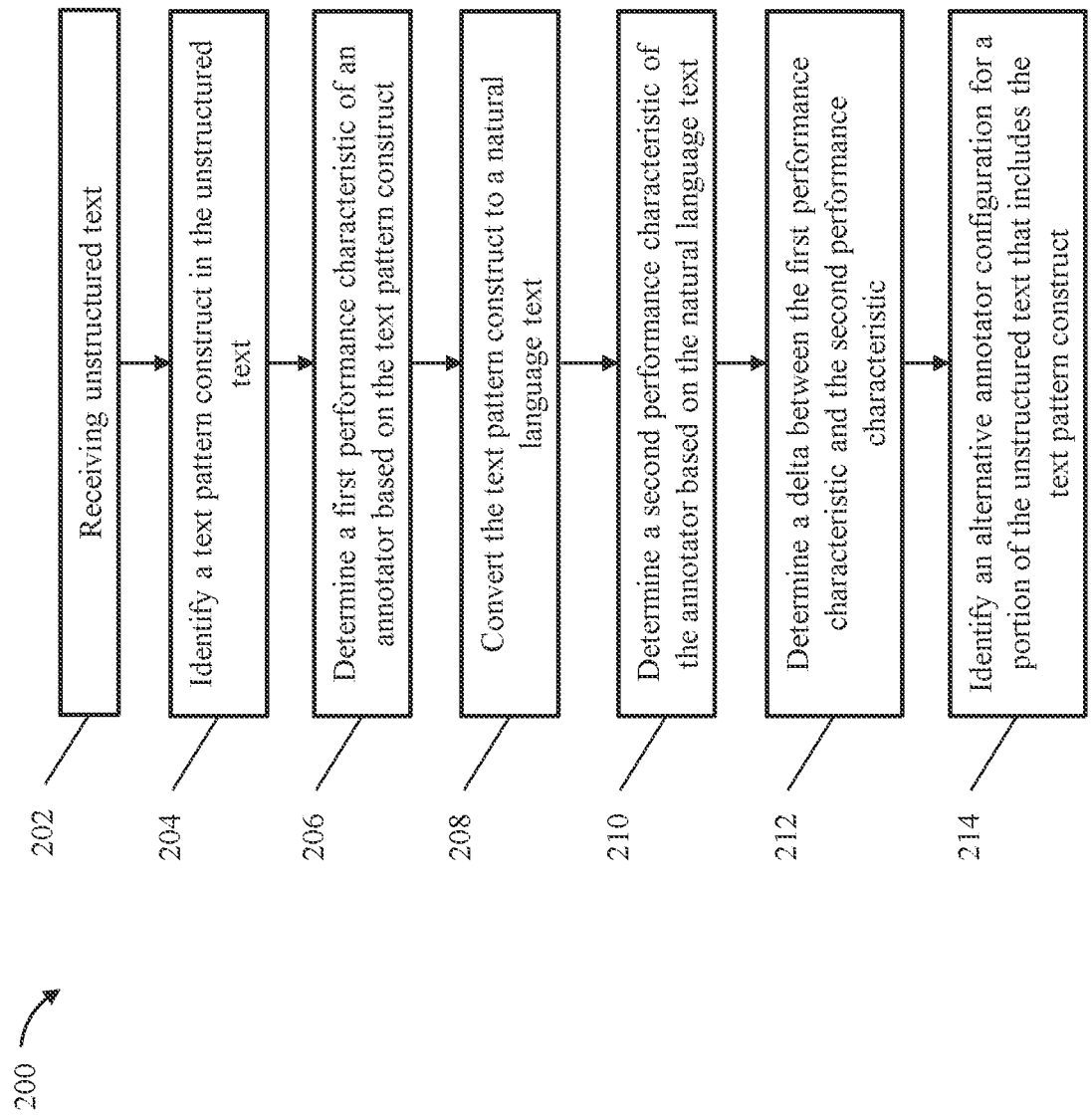
FIG. 2 depicts a flow diagram illustrating a method according to one or more embodiments of the invention.

FIG. 2 depicts a flow diagram 200 illustrating a method for evaluating the performance characteristics of annotator configurations against text pattern constructs in unstructured text according to one or more embodiments of the invention. As shown at block 202, unstructured text is received by a processor. In some embodiments of the invention, the unstructured text is received in a natural language processing (NLP) request from a client device. In some embodiments of the invention, the unstructured text includes a healthcare document.

At block 204, a text pattern construct is identified in the unstructured text. In some embodiments of the invention, the text pattern construct includes at least one of a comma-separated list, a bullet point, and a table. At block 206, a first performance characteristic of an annotator is determined based on the text pattern construct. In some embodiments of the invention, the first performance characteristic includes a first annotation output.

At block 208, the text pattern construct is converted to a natural language text. The text pattern construct can be converted to natural language using known natural language processing techniques and is not meant to be particularly limited. At block 210, a second performance characteristic of the annotator is determined based on the natural language text. In some embodiments of the invention, the second performance characteristic includes a second annotation output.

At block 212, a delta between the first performance characteristic and the second performance characteristic is determined. At block 214, an alternative annotator configuration for a portion of the unstructured text comprising the text pattern construct is identified. In some embodiments of the invention, the alternative annotator configuration includes an improved annotation accuracy with respect to the text pattern construct. In some embodiments of the invention, identifying the alternative annotator configuration includes searching an annotation database for annotator performance metadata against the text pattern construct. In some embodiments of the invention, an alternative annotator configuration is selected from a set of available annotator configurations within the annotation database that provides a highest annotation accuracy with respect to the text pattern construct.

In some embodiments of the invention, an alert is generated and transmitted to the client. In some embodiments of the invention, the alert identifies the alternative annotator configuration as a suggested annotator for the text pattern construct.

Figure 3:
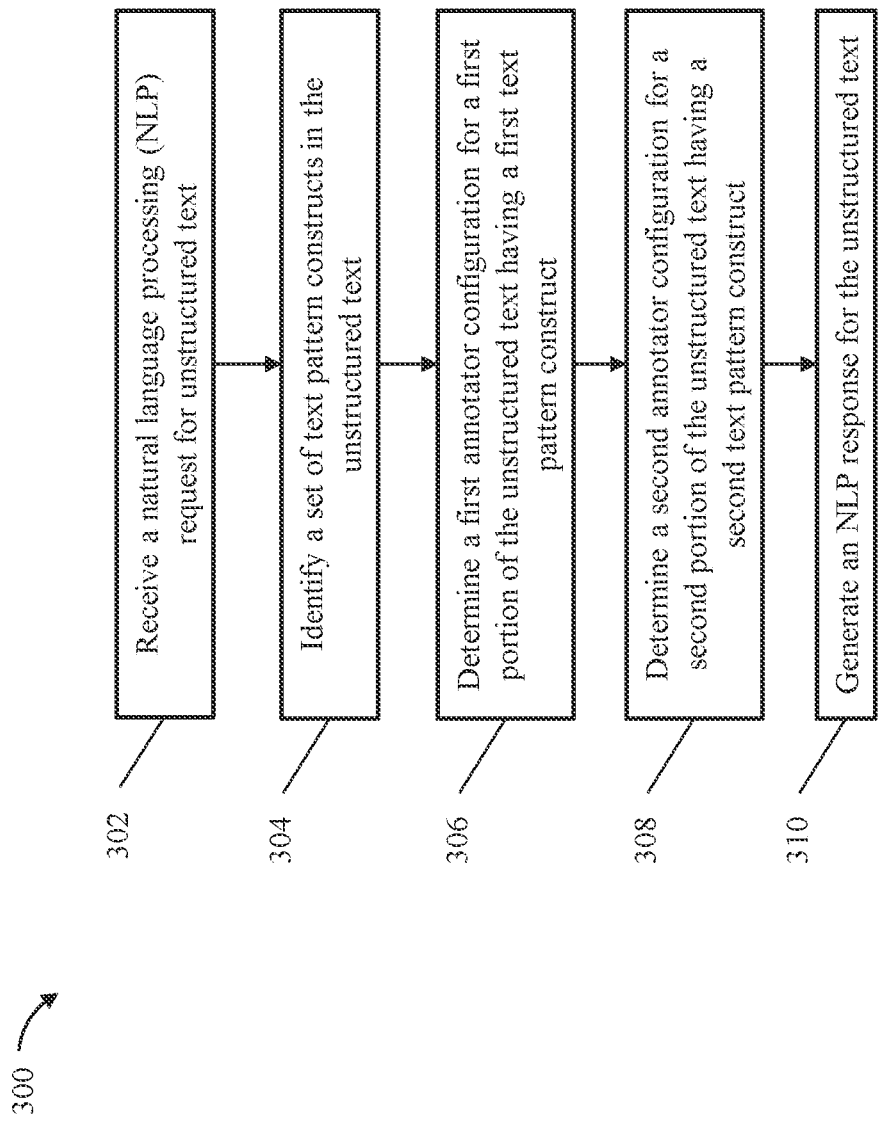
FIG. 3 depicts a flow diagram illustrating a method according to one or more embodiments of the invention.

FIG. 3 depicts a flow diagram 300 illustrating a method for selecting annotator configurations according to one or more embodiments of the invention. As shown at block 302, an NLP request can be received by an NLP service. The NLP request can include unstructured text.

At block 304, a set of text pattern constructs is identified in the unstructured text. In some embodiments of the invention, the set of text pattern constructs include at least a first text pattern construct and a second text pattern construct.

At block 306, a first annotator configuration is determined for a first portion of the unstructured text that includes the first text pattern construct. At block 308, a second annotator configuration is determined for a second portion of the unstructured text that includes the second text pattern construct. In some embodiments of the invention, determining the first annotator configuration and the second annotator configuration includes searching an annotation database for annotator performance metadata against the first text pattern construct and the second text pattern construct. In some embodiments of the invention, the first text pattern construct includes one of a comma-separated list, a bullet point, and a table. In some embodiments of the invention, the second text pattern construct includes one of a comma-separated list, a bullet point, and a table that is not the same as the first text pattern construct.

At block 310, an NLP response is generated for the unstructured text. In some embodiments of the invention, the NLP response includes a first annotation of the first portion of the unstructured text by the first annotator configuration and a second annotation of the second portion of the unstructured text by the second annotator configuration.

The process flow diagrams of FIGS. 2 and 3 are not intended to indicate that the operations of the methods 200 and 300 are to be executed in any particular order, or that all of the operations of the methods 200 and 300 are to be included in every case. Additionally, the methods 200 and 300 can include any suitable number of additional operations.

The processing methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
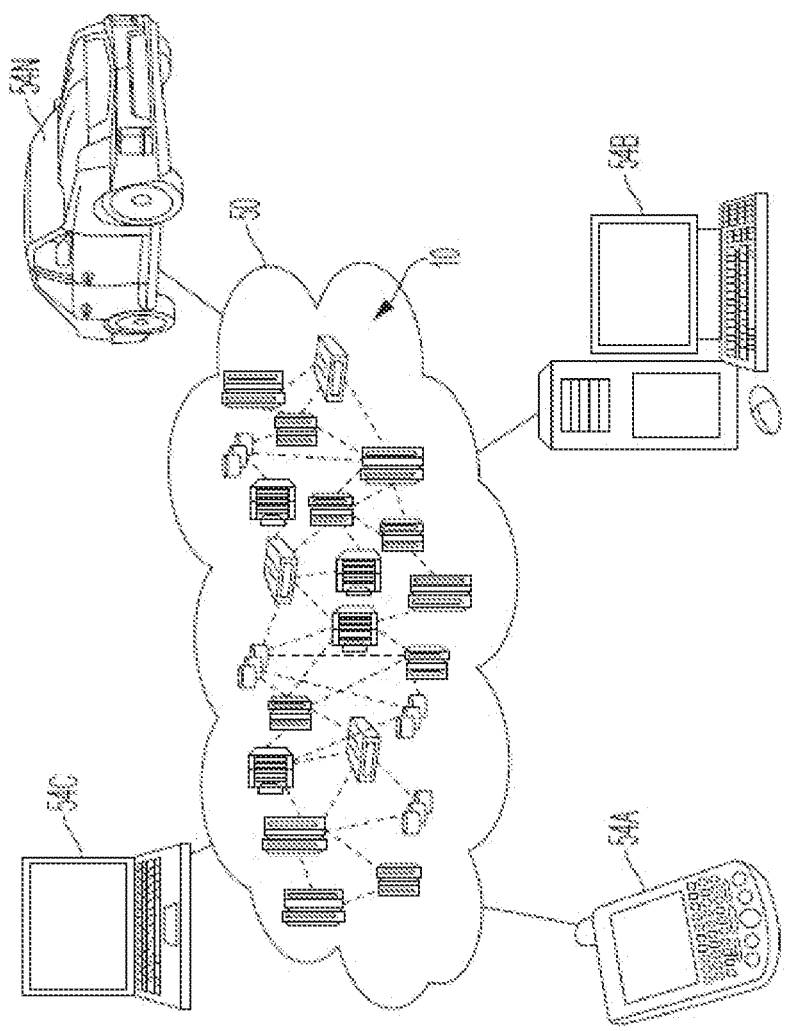
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
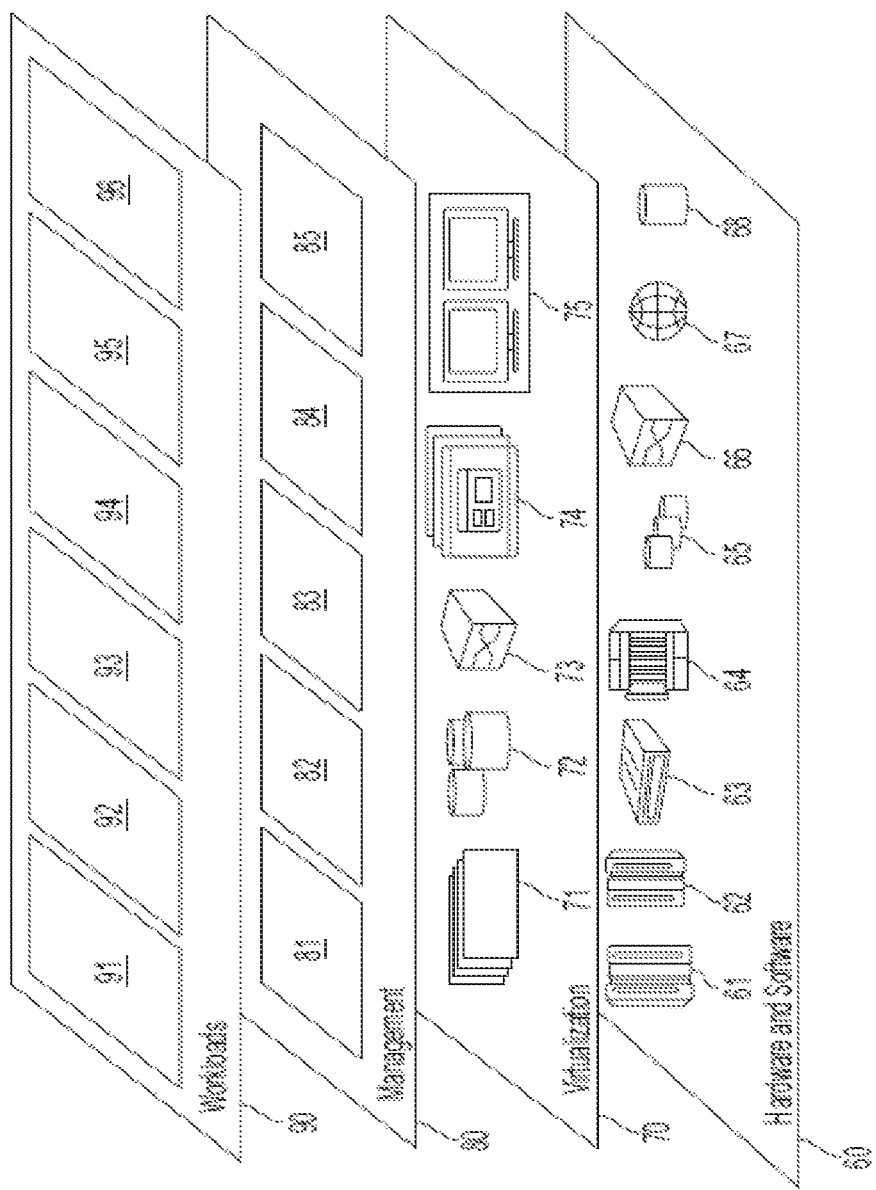
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 110 in FIG. 1) implemented in workloads and functions 96. Also, software applications can function with and/or be integrated with Resource provisioning 81.

Figure 6:
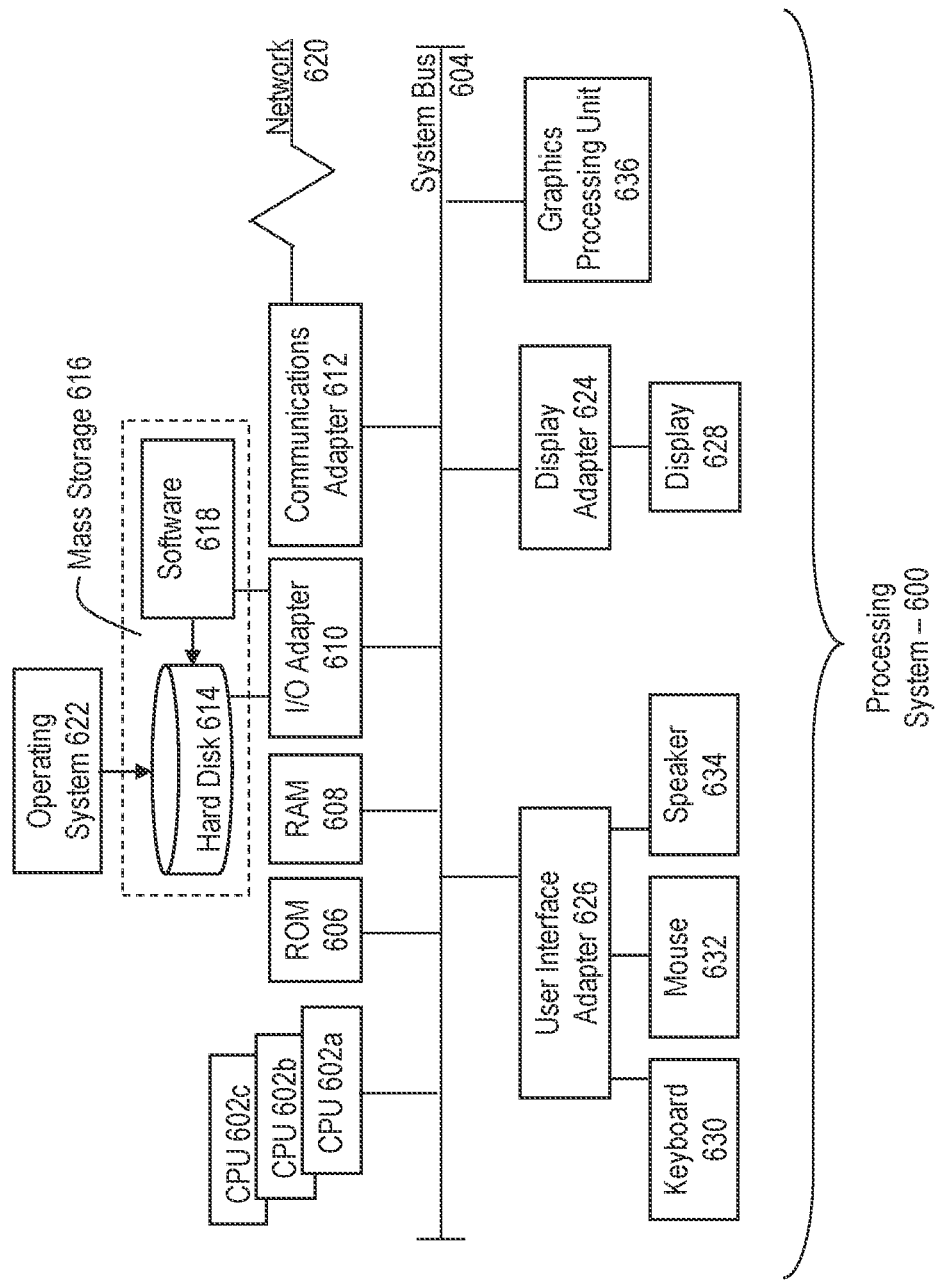
FIG. 6 is a block diagram of an example computer system for use in conjunction with one or more embodiments of the present invention.

Turning now to FIG. 6, a computer processing system 600 is generally shown in accordance with one or more embodiments of the invention. The processing system 600 can be an electronic, computer framework comprising and/or employing any number and combination of computing devices and networks utilizing various communication technologies, as described herein. The processing system 600 can be easily scalable, extensible, and modular, with the ability to change to different services or reconfigure some features independently of others. The processing system 600 may be, for example, a server, desktop computer, laptop computer, tablet computer, or smartphone. In some examples, processing system 600 may be a cloud computing node. Processing system 600 may be described in the general context of computer system executable instructions, such as program modules, being executed by a computer system. Generally, program modules may include routines, programs, objects, components, logic, data structures, and so on that perform particular tasks or implement particular abstract data types. Processing system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the processing system 600 has one or more central processing units (CPU(s)) 602a, 602b, 602c, etc., (collectively or generically referred to as processor(s) 602). The processors 602 can be a single-core processor, multi-core processor, computing cluster, or any number of other configurations. The processors 602, also referred to as processing circuits, are coupled via a system bus 604 to a read only memory (ROM) 606 and a random access memory (RAM) 608 (collectively, the system memory). The ROM 606 is coupled to the system bus 604 and may include a basic input/output system (BIOS) or its successors like Unified Extensible Firmware Interface (UEFI), which controls certain basic functions of the processing system 600. The RAM is read-write memory coupled to the system bus 604 for use by the processors 602. The system memory provides temporary memory space for operations of said instructions during operation. The system memory can include random access memory (RAM), read only memory, flash memory, or any other suitable memory systems.

The processing system 600 comprises an input/output (I/O) adapter 610 and a communications adapter 612 coupled to the system bus 604. The I/O adapter 610 may be a small computer system interface (SCSI) adapter that communicates with a hard disk 614 and/or any other similar component. The I/O adapter 610 and the hard disk 614 are collectively referred to herein as a mass storage 616.

Software 618 for execution on the processing system 600 may be stored in the mass storage 616. The mass storage 616 is an example of a tangible storage medium readable by the processors 602, where the software 618 is stored as instructions for execution by the processors 602 to cause the processing system 600 to operate, such as is described herein below with respect to the various Figures. Examples of computer program product and the execution of such instruction is discussed herein in more detail. The communications adapter 612 interconnects the system bus 604 with a network 620, which may be an outside network, enabling the processing system 600 to communicate with other such systems. In one embodiment, a portion of the system memory and the mass storage 616 collectively store an operating system 622, which may be any appropriate operating system to coordinate the functions of the various components shown in FIG. 6.

Additional input/output devices are shown as connected to the system bus 604 via a display adapter 624 and a user interface adapter 626. In one embodiment, the adapters 610, 612, 624, and 626 may be connected to one or more I/O buses that are connected to the system bus 604 via an intermediate bus bridge (not shown). A display 628 (e.g., a screen or a display monitor) is connected to the system bus 604 by the display adapter 624, which may include a graphics processing unit 636 (graphics controller) to improve the performance of graphics intensive applications and a video controller. A keyboard 630, a mouse 632, a speaker 634, etc., can be interconnected to the system bus 604 via the interface adapter 626, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 6, the processing system 600 includes processing capability in the form of the processors 602, and, storage capability including the system memory and the mass storage 616, input means such as the keyboard 630 and the mouse 632, and output capability including the speaker 634 and the display 628.

In some embodiments, the communications adapter 612 can transmit data using any suitable interface or protocol, such as the internet small computer system interface, among others. The network 620 may be a cellular network, a radio network, a wide area network (WAN), a local area network (LAN), or the Internet, among others. An external computing device may connect to the processing system 600 through the network 620. In some examples, an external computing device may be an external webserver or a cloud computing node.

It is to be understood that the block diagram of FIG. 6 is not intended to indicate that the processing system 600 is to include all of the components shown in FIG. 6. Rather, the processing system 600 can include any appropriate fewer or additional components not illustrated in FIG. 6 (e.g., additional memory components, embedded controllers, modules, additional network interfaces, etc.). Further, the embodiments described herein with respect to processing system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Any of the components shown in FIG. 6 may be coupled to each other via a network. The network(s) may be implemented by any network(s) known in the art such as, but not limited to a local area network (LAN), a direct cable connection, a cloud computing environment such as that shown below in FIG. 4, and/or the Internet.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments described herein whether or not explicitly stated.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for evaluating the performance characteristics of annotator configurations against text pattern constructs in unstructured text, the computer-implemented method comprising:
    receiving, by a processor, unstructured text;
    identifying, by the processor, a text pattern construct in a portion of the unstructured text;
    evaluating an annotation performance of a first annotator configuration, whose annotation performance for the identified text pattern construct is not known, against the identified text pattern construct, wherein evaluating the annotation performance comprises:
        determining, by the processor, a first performance characteristic of the first annotator configuration based on the text pattern construct;
        converting, by the processor, the text pattern construct to a natural language text;
        determining, by the processor, a second performance characteristic of the first annotator configuration based on the natural language text; and
        determining, by the processor, a delta between the first performance characteristic and the second performance characteristic; and
    in response to the annotation performance being below a performance metric, identifying, by the processor, an alternative annotator configuration for the portion of the unstructured text comprising the text pattern construct, wherein the alternative annotator configuration has a known annotation performance for the identified text pattern construct that is greater than the performance metric.

2. The method of claim 1, wherein the alternative annotator configuration comprises an improved annotation accuracy with respect to the text pattern construct.

3. The method of claim 1, wherein receiving the unstructured text comprises receiving, from a client, a natural language processing (NLP) request comprising a healthcare document comprising the unstructured text.

4. The method of claim 3 further comprising generating an alert to the client, the alert identifying the alternative annotator configuration.

5. The method of claim 1, wherein the first performance characteristic comprises a first annotation output and the second performance characteristic comprises a second annotation output.

6. The method of claim 1, wherein identifying the alternative annotator configuration comprises searching an annotation database for annotator performance metadata against the identified text pattern construct.

7. The method of claim 6, wherein identifying the alternative annotator configuration further comprises selecting the alternative annotator configuration from a set of available annotator configurations within the annotation database that comprises a highest annotation accuracy with respect to the identified text pattern construct.

8. A system comprising:
    one or more processors for executing computer readable instructions, the computer readable instructions controlling the one or more processors to perform operations comprising:
        receiving unstructured text;
        identifying a text pattern construct in a portion of the unstructured text;
        evaluating an annotation performance of a first annotator configuration, whose annotation performance for the identified text pattern construct is not known, against the identified text pattern construct, wherein evaluating the annotation performance comprises:
            determining a first performance characteristic of the first annotator configuration based on the text pattern construct;
            converting the text pattern construct to a natural language text;
            determining a second performance characteristic of the first annotator configuration based on the natural language text; and
            determining a delta between the first performance characteristic and the second performance characteristic; and
        in response to the annotation performance being below a performance metric, identifying an alternative annotator configuration for the portion of the unstructured text comprising the text pattern construct, wherein the alternative annotator configuration has a known annotation performance for the identified text pattern construct that is greater than the performance metric.

9. The system of claim 8, wherein the alternative annotator configuration comprises an improved annotation accuracy with respect to the text pattern construct.

10. The system of claim 8, wherein receiving the unstructured text comprises receiving, from a client, a natural language processing (NLP) request comprising a healthcare document comprising the unstructured text.

11. The system of claim 10 further comprising generating an alert to the client, the alert identifying the alternative annotator configuration.

12. The system of claim 8, wherein the first performance characteristic comprises a first annotation output and the second performance characteristic comprises a second annotation output.

13. The system of claim 8, wherein identifying the alternative annotator configuration comprises searching an annotation database for annotator performance metadata against the text pattern construct.

14. The system of claim 13, wherein identifying the alternative annotator configuration further comprises selecting the alternative annotator configuration from a set of available annotator configurations within the annotation database that comprises a highest annotation accuracy with respect to the text pattern construct.

15. A computer program product comprising a computer readable storage medium having program instructions embodied therewith, the program instructions executable by one or more processors to cause the one or more processors to perform operations comprising:
   receiving unstructured text;
   identifying a text pattern construct in a portion of the unstructured text;
   evaluating an annotation performance of a first annotator configuration, whose annotation performance for the identified text pattern construct is not known, against the identified text pattern construct, wherein evaluating the annotation performance comprises:
      determining a first performance characteristic of the first annotator configuration based on the text pattern construct;
      converting the text pattern construct to a natural language text;
      determining a second performance characteristic of the first annotator configuration based on the natural language text; and
      determining a delta between the first performance characteristic and the second performance characteristic; and
   in response to the annotation performance being below a performance metric, identifying an alternative annotator configuration for the portion of the unstructured text comprising the text pattern construct, wherein the alternative annotator configuration has a known annotation performance for the identified text pattern construct that is greater than the performance metric.

16. The computer program product of claim 15, wherein the alternative annotator configuration comprises an improved annotation accuracy with respect to the text pattern construct.

17. The computer program product of claim 15, wherein receiving the unstructured text comprises receiving, from a client, a natural language processing (NLP) request comprising a healthcare document comprising the unstructured text.

18. The computer program product of claim 15, wherein the first performance characteristic comprises a first annotation output and the second performance characteristic comprises a second annotation output.

19. The computer program product of claim 15, wherein identifying the alternative annotator configuration comprises searching an annotation database for annotator performance metadata against the text pattern construct.

20. The computer program product of claim 19, wherein identifying the alternative annotator configuration further comprises selecting the alternative annotator configuration from a set of available annotator configurations within the annotation database that comprises a highest annotation accuracy with respect to the text pattern construct.

* * * * *